(12) United States Patent
Mahrla et al.

(10) Patent No.: US 7,631,210 B2
(45) Date of Patent: Dec. 8, 2009

(54) DEBUG MODE IN POWER SUPPLY UNITS FOR ELECTRONIC APPLIANCES

(75) Inventors: Peter Mahrla, Zorneding (DE); Markus Müllauer, Friesach (AT)

(73) Assignee: Infineon Technologies AG (DE)

( * ) Notice: Subject to any disclaimer, the term of this patent is extended or adjusted under 35 U.S.C. 154(b) by 566 days.

(21) Appl. No.: 10/992,124

(22) Filed: Nov. 18, 2004

(65) Prior Publication Data

US 2005/0120277 A1   Jun. 2, 2005

(30) Foreign Application Priority Data

Nov. 18, 2003   (DE) ................. 103 53 698

(51) Int. Cl.
  *G06F 11/00*   (2006.01)
(52) U.S. Cl. ........................ 713/340; 714/25
(58) Field of Classification Search ........... 713/340; 714/25
  See application file for complete search history.

(56) References Cited

U.S. PATENT DOCUMENTS

| | | | | |
|---|---|---|---|---|
| 3,979,732 A | * | 9/1976 | Hepworth et al. | 710/108 |
| 4,204,633 A | * | 5/1980 | Goel | 714/738 |
| 4,837,552 A | * | 6/1989 | Vandemotter et al. | 340/461 |
| 5,596,716 A | * | 1/1997 | Byers et al. | 714/48 |
| 6,208,117 B1 | * | 3/2001 | Hibi | 320/134 |
| 6,577,979 B1 | * | 6/2003 | Okitaka | 702/117 |
| 6,678,268 B1 | * | 1/2004 | Francis et al. | 370/380 |

FOREIGN PATENT DOCUMENTS

| | | |
|---|---|---|
| DE | 40 40 927 A1 | 6/1992 |
| EP | 0 357 588 A2 | 3/1990 |

* cited by examiner

*Primary Examiner*—Tse Chen
(74) *Attorney, Agent, or Firm*—Dickstein, Shapiro, LLP.

(57) ABSTRACT

In a method for recording critical parameters for circuit sections of electronic appliances, the critical parameters are represented by status bits in a status register (24). As a result of a change of state for a critical parameter, the associated status bit assumes a new value and retains this value up until a read operation.

15 Claims, 3 Drawing Sheets

23

| Bit | Name | Reset value | Description |
|---|---|---|---|
| 7 | EIOTW | 1 | TRIGGER INTERRUPT IF OTW CRITICAL |
| 6 | RAGOTW | 1 | ... |
| 5 | | 0 | ... |
| 4 | OTSEN | 1 | ... |
| 3 | EIVBOUT | 1 | ... |
| 2 | EIVBH | 1 | ... |
| 1 | EION | 1 | ... |
| 0 | DEBUG | 0 | GEF1 MODE OF OPERATION 2 |
| | | 1 | GEF 1 MODE OF OPERATION 1 |

FIG 3A

GEF1

24

| Bit | Name | Reset value | Status | Remarks |
|---|---|---|---|---|
| 7 |  | 0 | RESERVED | ... |
| 6 | LUSB | 0 | LOAD CURRENT ON LUSB EXCEEDED | ... |
| 5 | LRF3 | 1 | ... | ... |
| 4 | LRFC | 1 | ... | ... |
| 3 | LRF1 | 1 | ... | ... |
| 2 | LRF2 | 0 | ... | ... |
| 1 | LANA | 0 | ... | ... |
| 0 | LINT | 0 | ... | ... |

FIG 3B

| Bit | Name | Reset value | Description |
|---|---|---|---|
| 7 | EIOTW | 1 | TRIGGER INTERRUPT IF OTW CRITICAL |
| 6 | RAGOTW | 1 | ... |
| 5 |  | 0 | ... |
| 4 | OTSEN | 1 | ... |
| 3 | EIVBOUT | 1 | ... |
| 2 | EIVBH | 1 | ... |
| 1 | EION | 1 | ... |
| 0 | DEBUG | 0 | GEF1 MODE OF OPERATION 2 |
|  |  | 1 | GEF 1 MODE OF OPERATION 1 |

23

US 7,631,210 B2

DEBUG MODE IN POWER SUPPLY UNITS FOR ELECTRONIC APPLIANCES

PRIORITY

This application claims priority to German application no. 103 53 698.1 filed Nov. 18, 2003.

TECHNICAL FIELD OF THE INVENTION

The present invention relates to a method for recording the states of critical parameters which arise in circuit sections of an electronic appliance. This method may be used, in particular, as a mode of operation for software test passes on the electronic appliance and can be used for improved and more efficient error recognition.

BACKGROUND OF THE INVENTION

Power supply units in electronic appliances often perform a multiplicity of tasks. They usually have to deliver a plurality of voltages for the various components and have sensors and drivers for peripheral devices. In this context, the instantaneous power requirement of the various loads in the electronic appliance may, in an unfavourable instance, exceed the average load by a multiple. A power supply unit which also keeps such load peaks under control would be overproportioned for normal operation, however.

In mains-independent, battery-operated appliances such as mobile telephones and portable computers (e.g. personal digital assistants (PDAs)), on the other hand, the size of the appliance needs to be minimized. Dimensioning the power supply unit for all conceivable load scenarios is therefore not acceptable. Rather, it is the task of intelligent control software to minimize the load peaks on the power supply unit through clever load distribution over the various loads, for example as a result of turning on at different times.

The quality of the control software therefore determines the necessary dimensioning of the power supply unit and thus also influences the size of the appliance. It is therefore becoming increasingly important to develop the control software, which generally runs on a microcontroller.

In a first phase of the development of the control software, the behaviour of the power supply unit and of the connected peripheral devices (arising currents and voltages, quantities of heat etc.) in various load scenarios is usually simulated. In this context, the underlying model includes empirically known characteristics of the power supply unit and of the connected peripheral devices, such as the heat dissipation behaviour and the power requirement.

In a second phase, the simulated load scenarios are verified experimentally by test passes. If an error situation arises in this case, for example in the form of overloading of the power supply unit or of the connected peripheral devices as the result of limit values being exceeded for particular critical parameters such as current, voltage or temperature, then in many cases an interrupt signal is transmitted by the power supply unit to the microcontroller on which the control software is running, which aborts the test pass. This results in a multiplicity of test passes needing to be carried out, with the cause of the abortion of a test pass, the subsequent error recognition and elimination and then a fresh test pass respectively needing to be carried out iteratively.

SUMMARY OF THE INVENTION

It is accordingly an object of the invention to specify a method which can be used to improve the development process for control software for electronic appliances.

This object can be achieved by a method for recording the states of critical parameters which arise in circuit sections of an electronic appliance, comprising the steps of representing the states of the critical parameters by status bits in a status register, and changing the value of the associated status bit and retaining the changed value up until a read operation by a change of state for a critical parameter.

The associated status bit can be set after the read operation to a value which corresponds to the current state of the critical parameter. The method may represent a first mode of operation which is carried out only when a control register has prescribed values, particularly when a prescribed value has been set in a control bit in the control register. When the control register does not have one of the prescribed values a second mode of operation can be carried out in which the values of the status bits are continuously matched to the states of the respectively associated critical parameters. The method of the first mode of operation can be executed when the electronic appliance is subjected to a test pass by a software program. The software program may prescribe that read operations in the status register be carried out at prescribed times. A setting can be made regarding whether the change of state for the critical parameters interrupts the test pass. A control register for particular critical parameters may contain interrupt bits whose value determines whether the change of state for the critical parameters interrupts the test pass. The critical parameters can be monitored and when prescribed limit values are reached or exceeded a change of state can be detected and a corresponding error signal is sent to the status register. The method can be executed by a system control unit and a power supply unit, the power supply unit containing the status register and the read operation being carried out by the system control unit. The software program for the test pass can be held in the system control unit or can be loaded into it. The circuit sections can be held, at least to some extent, in the power supply unit and can be provided, in particular, by circuit units, particularly voltage regulating units. The critical parameters may include current, voltage and temperature values, particularly load currents from voltage regulating units.

The invention is first of all based on the insight that test passes during the development of control software for circuit units can be carried out more effectively and in more targeted fashion if the quality of the report about the errors which have arisen in particular circuit sections of the electronic appliance is improved. In particular, this allows the underlying cause of error to be localized more easily and more efficiently.

The invention makes provision for states of critical parameters which arise in circuit sections of an electronic appliance, and hence may also be regarded as operating states of these circuit sections, to be recorded or registered. This is done using a status register in which the states of the critical parameters are represented by status bits. A fundamental concept of the invention is now that a change of state for a critical parameter changes the value of the associated status bit and retains the changed value up until a read operation.

When an error situation such as the exceeding of a limit value for a critical parameter has arisen, the new value of the associated status bit needs to be retained, regardless of the further behaviour of the associated critical parameter, in particular regardless of a possible end to the error situation or a return by the critical parameter to the original state. The status bit retains the new value up until a read operation.

This type of error registration allows a test pass to be carried out fully and without interruption, since errors which have arisen in the meantime may also be detected after the test pass has ended by evaluating the status register. It is no longer necessary to abort the test pass after every change of state for a critical parameter and then to carry out error recognition using the interrupt signal which triggers the interruption.

In particular, provision is made in this context for the status bits for the critical parameters to be reset after the read operation to a value which corresponds to the current state of the critical parameters. Hence, the test pass can be continued and, if desired, a further read operation can be carried out after a prescribed time. The status register may thus be read a plurality of times during the test pass, and, depending on the interval of time between the read operations, the errors which have arisen during the test pass can be detected almost completely and can subsequently be evaluated.

The actual cause of error can be dealt with in more targeted fashion using the inventive method, which means that the development process for the control software is significantly improved. Most importantly, much more detailed tests can be carried out, which results in greater perfection in the software.

It is also advantageous if the method described above represents a first mode of operation which is carried out only when a control bit held in the control register has a prescribed value. The inventive method then forms an error elimination or debug mode which, by way of example, can be activated during the development phase for the control.

When the control bit does not have this prescribed value a second mode of operation is carried out in which the values of the status bits are continually matched to the states of the respectively associated critical parameters, that is to say a status bit assumes a new value on the basis of a change of state and retains this new value only for as long as the changed state of the critical parameter lasts. It is thus possible to take account of the fact that the first mode of operation is needed only in particular situations, such as software test passes. The software can then set the control bit to the prescribed value.

The software program for the test pass can prescribe that read operations in the status register be carried out at prescribed times.

It has already been found to be an advantage of the invention that changes of state for the critical parameters do not necessitate interruption of the test pass or triggering of any corresponding interrupt signals. However, it is advantageous if it is up to the user to allow interrupt signals to be triggered upon changes of state for particular critical parameters. For this purpose, provision may be made for particular or all critical parameters to be shown in a control register and for them to have a respective associated interrupt bit whose value determines whether the change of state for the critical parameter interrupts the test pass. It is thus possible for the user to use the software program for the test pass to set whether an interruption is triggered for particular changes of state.

The method can be executed by a system control unit and a power supply unit, the power supply unit containing the status register, and the read operation being carried out by the system control unit. If the electronic appliance is a mobile communication appliance or a PDA, the system control unit may be formed by the microcontroller. The system control unit executes the control software for the power supply unit. The software program for the test pass may likewise be held in the system control unit or may be loaded into it.

The circuit sections may be held, at least to some extent, in the power supply unit and may be provided, in particular, by circuit units such as voltage regulating units or the like. However, the circuit sections may equally be provided by peripheral circuits, that is to say circuits outside the power supply unit, as well. Since essentially all circuit units in an electronic appliance interact with the power supply unit and with the central controller, complex error scenarios may arise in this context. The use of the inventive method to localize causes of error is particularly advantageous here.

The critical parameters may include current, voltage and temperature values. In particular, they include load currents from voltage regulating units. The critical parameters are monitored by suitable sensor units and, in the event of prescribed limit values being reached or exceeded or undershot, a change of state is detected and a corresponding error signal is sent to the status register.

BRIEF DESCRIPTION OF THE DRAWINGS

The invention is explained in more detail below with reference to exemplary embodiments in conjunction with the figures of the drawing, in which:

FIG. 3 shows the exemplary illustration of a status register (a) and a control register (b).

DETAILED DESCRIPTION OF EMBODIMENTS

Figure 1:
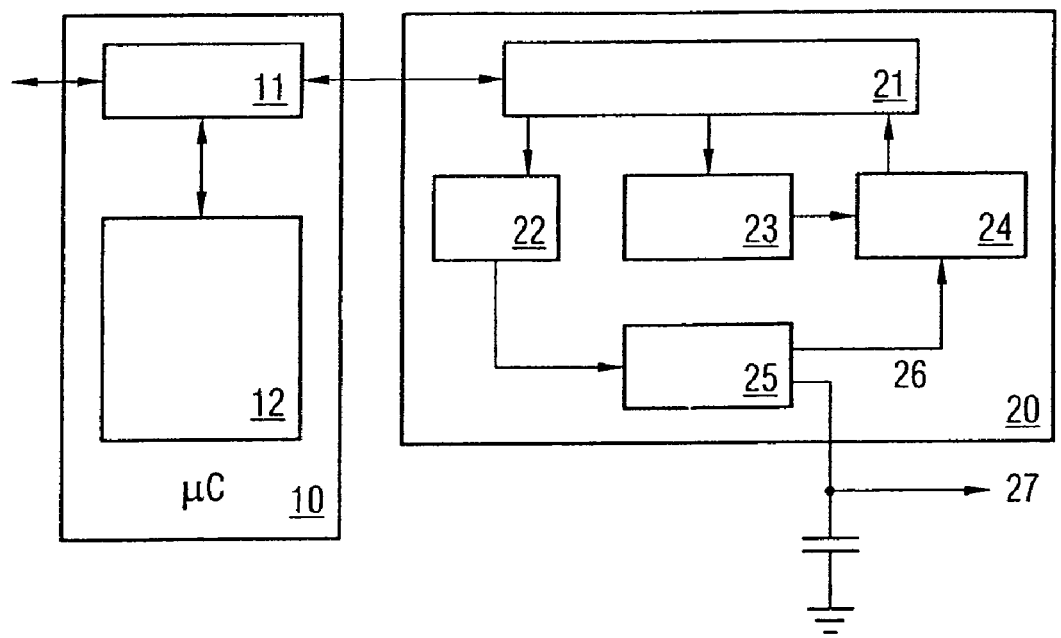
FIG. 1 shows the basic design of the invention.

FIG. 1 shows the basic design of a circuit arrangement in an electronic appliance for carrying out the inventive method. A system control unit 10, which may be formed by the microprocessor in the electronic appliance, contains a piece of control software 12 which uses interfaces 11 to control various circuit units in the electronic appliance, with the system control unit 10 actuating the power supply unit 20, in particular. The control software 12 likewise comprises software for test passes which are carried out on the power supply unit 20. Read/write interfaces 21 can be used to set various control registers 22 and 23 and to read status registers 24. The control registers 22, 23 are in the form of write registers, while the status registers 24 are in the form of read registers. Only write access is possible to the write registers, while only read access is possible to the read registers. Alternatively, the control registers may also be in the form of read and write registers.

The power supply unit 20 also includes voltage regulating units 25 which provide DC voltages for other assemblies and circuit parts. A voltage regulating unit 25 is also shown by way of example.

With regard to the control register, a distinction is drawn between function-related control registers 22 and configuration-related control registers 23. The function-related control registers 22 control the function of the respective circuit unit in the normal state, that is to say the turning-on and turning-off of the circuit unit, for example, while the configuration-related control registers determine the configuration of the system for the execution of a test pass and the accompanying error recognition and the response to errors which are recognized.

FIG. 3 shows the contents of a configuration-related control register 23 and of a status register 24 using tables.

The status register 24 is labelled GEF1 (General Error Flag) and has bit positions 0 to 7 which are shown in the "bit" column. Each of these bit positions relates to a particular critical parameter, such as the load current from a voltage regulating unit. In as much as critical parameters are linked to one specific circuit unit, the bit positions have the associated system-internal labels (used by the software) for the respective circuit units and are shown in the "name" column. Each bit position also has a reset value which identifies the value of the bit in the uncritical normal state. This reset value may be "0" or "1" and is shown in the "Reset value" column. If a critical change of state is detected, such as a limit value being exceeded for the associated critical parameter, the bit position's bit value is changed, that is to say is changed from the reset value adopted at the outset to the respective other bit value. The "status" column denotes the critical parameter to which the bit position relates, that is to say the load current from a voltage regulating unit, for example, in more detail. This may also be, by way of example, temperature values on particular circuit sections of the power supply unit. A "remarks" column may be used in a piece of documentation for further explanatory entries relating to the bit positions.

The configuration-related control register 23 is of similar design. It has entries which relate to whether an interrupt command is to be triggered when changes of state for critical parameters are detected. The individual bit positions may thus each relate to particular bit positions in the status registers, with the respective value of the bit determining whether or not the interrupt command is triggered. With reference to the first row, if the bit position is at the reset value "1", it is possible—as indicated in the example—to trigger an interrupt when a critical parameter OTW, for example a temperature measurement, has changed its state in the status register on account of an error signal. When the bit position has been set to "0", no interrupt is triggered.

In addition, the control register 23 has a bit position, in the present case the bit position "0", which is labelled "DEBUG" and whose bit value determines what mode of operation is to be carried out. If the bit value, which is labelled "reset value" in the appropriate column in this case, is "1", the first mode of operation is carried out in line with the inventive method. The bit values of the status registers cited in the "description" column are accordingly retained for a change of state for the associated critical parameters up until a read operation. If the bit value of the "DEBUG" bit is "0", however, the bit values always follow the respective state of the critical parameters.

If the load current 27 from the voltage regulating unit 25 exceeds a particular threshold value in FIG. 1, this is detected in suitable fashion and the voltage regulating unit 25 prompts an error signal 26 to be sent to the status register 24. This error signal 26 changes the bit value at the appropriate bit position in the status register 24. If the "DEBUG" bit in the control register 23 has the value "1", the changed bit value of the status register is kept, even if the load current subsequently enters the uncritical range again, so that the error signal 26 no longer occurs. If the "DEBUG" bit in the control register 23 has the value "0", however, the bit value in the status register 24 follows the intensity of the error signal 26.

For the load current from the voltage regulating unit 25, the control register 23 may contain a bit position whose value decides whether or not the error signal 26 triggers an interrupt command.

Figure 2:
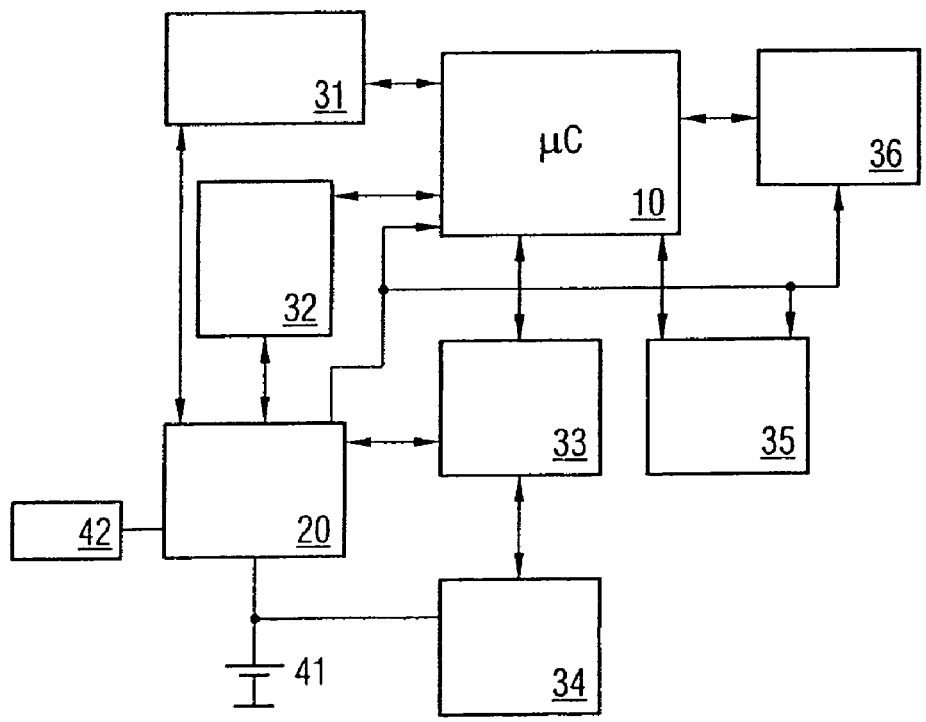
FIG. 2 shows an exemplary embodiment of a mains-independent, electronic appliance.

FIG. 2 shows an exemplary embodiment with reference to a mains-independent, electronic appliance, for example a mobile telephone. The power supply unit 20 delivers supply voltages for the various assemblies in the mobile telephone, such as the system control unit 10 and various co-ordinate circuit units 31-35 and peripheral devices 36. The system control unit 10 is provided by a microcontroller. In the exemplary embodiment, the co-ordinate circuit units include memory chips 31, an analogue signal processor 32, a radio-frequency reception and transmission unit 33, a radio-frequency amplifier 34 and a Bluetooth chip 35. The peripheral devices 36 include supplementary appliances and interfaces connected to the electronic appliance.

The power supply unit 20 draws electrical power from the battery 41 or from the mains adapter 42 and, if there is a network adapter 42, controls the charging of the battery 41. The power supply unit 20 contains the status register 24, in which—as described—the various error situations (such as overheating of components, overvoltages and the exceeding of upper limits for load currents) are recorded in the form of status bits. The microcontroller 10 controls the power supply chip 20 and the various co-ordinate circuit units 31-35 and peripheral devices 36. These are controlled using control software which has been loaded into the microcontroller. The microcontroller 10 is able to select the described modes of operation of the power supply unit 20 or of the status registers 24 which the latter contains by setting the various control bits in the control registers, is thereby able to activate the inventive error elimination or debug mode and is able to read the status registers 24.

We claim:

1. A method for recording the states of critical circuit parameters which arise in circuit sections of an electronic appliance, comprising:
   representing the states of the critical circuit parameters by status bits in a status register;
   changing the value of the associated status bit upon change of a state for a critical parameter; and
   retaining the changed value up until a read operation, when a control register has prescribed values, particularly when a prescribed value has been set in a control bit in the control register prior to the change in the value of the associated status bit,
   wherein when the control register does not have one of the prescribed values, the values of the status bits are continuously matched to the states of the respectively associated critical circuit parameters.

2. The method according to claim 1, wherein the method of the first mode of operation is executed when the electronic appliance is subjected to a test pass by a software program.

3. The method according to claim 1, wherein the method of the first mode of operation is executed when the electronic appliance is subjected to a test pass by a software program.

4. The method according to claim 3, wherein the software program prescribes that read operations in the status register be carried out at prescribed times.

5. The method according to claim 3, wherein a setting is made regarding whether the change of state for the critical circuit parameters interrupts the test pass.

6. The method according to claim 4, wherein a setting is made regarding whether the change of state for the critical circuit parameters interrupts the test pass.

7. The method according to claim 5, wherein a control register for particular critical circuit parameters contains interrupt bits whose value determines whether the change of state for the critical circuit parameters interrupts the test pass.

8. The method according to claim 1, wherein the critical circuit parameters are monitored and when prescribed limit values are reached or exceeded a change of state is detected and a corresponding error signal is sent to the status register.

9. The method according to claim 1, wherein the method is executed by a system control unit and a power supply unit, the power supply unit containing the status register and the read operation being carried out by the system control unit.

10. The method according to claim 1, wherein the method is executed by a system control unit and a power supply unit, the power supply unit containing the status register and the read operation being carried out by the system control unit, wherein the power supply unit contains the control register, and the system control unit controls the value assumed by the control register, particularly the control bit.

11. The method according to claim 2, wherein the software program for the test pass is held in the system control unit or can be loaded into it.

12. The method according to claim 9, wherein the circuit sections are held, at least to some extent, in the power supply unit and are provided, in particular, by circuit units, particularly voltage regulating units.

13. The method according to claim 1, wherein the critical circuit parameters include current, voltage and temperature values, particularly load currents from voltage regulating units.

14. A method for recording the states of critical circuit parameters which arise in circuit sections of an electronic appliance, comprising:
  representing the states of the critical circuit parameters by status bits in a status register; and
  changing the value of an associated status bit and retaining the changed value up until a read operation by a change of state for a changed critical circuit parameter,
  wherein the status bit is set after the read operation to a value which corresponds to the current state of the changed critical circuit parameter, and
  wherein the method represents a first mode of operation which is carried out only when a control register has prescribed values, particularly when a prescribed value has been set in a control bit in the control register prior to the change in the value of the associated status bit.

15. A method for recording the states of critical circuit parameters which arise in circuit sections of an electronic appliance, comprising:
  representing the states of the critical circuit parameters by status bits in a status register; and
  changing the value of the associated status bit and retaining the changed value up until a read operation by a change of state for a changed critical circuit parameter,
  wherein the method represents a first mode of operation which is carried out only when a prescribed value has been set in a control bit in the control register prior to the change in the value of the associated status bit, and
  wherein when the control register does not have one of the prescribed values, a second mode of operation is carried out in which the values of the status bits are continuously matched to the states of the respectively associated critical circuit parameters.

* * * * *